United States Patent
Jiang et al.

(10) Patent No.: US 9,830,261 B2
(45) Date of Patent: Nov. 28, 2017

(54) REGION DESCRIPTOR MANAGEMENT METHOD AND ELECTRONIC APPARATUS THEREOF

(71) Applicant: Lite-On Technology Corporation, Taipei (TW)

(72) Inventors: Wei-Ling Jiang, Taipei (TW); Yi-Chung Lee, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 99 days.

(21) Appl. No.: 14/700,114

(22) Filed: Apr. 29, 2015

(65) Prior Publication Data
US 2016/0259722 A1 Sep. 8, 2016

(30) Foreign Application Priority Data

Mar. 5, 2015 (TW) .............................. 104107010 A

(51) Int. Cl.
*G06F 12/00* (2006.01)
*G06F 12/04* (2006.01)
(Continued)

(52) U.S. Cl.
CPC ............ *G06F 12/04* (2013.01); *G06F 3/0601* (2013.01); *G06F 3/0614* (2013.01);
(Continued)

(58) Field of Classification Search
CPC .... G06F 3/0601; G06F 3/0614; G06F 3/0668; G06F 3/0631; G06F 3/0658;
(Continued)

(56) References Cited

U.S. PATENT DOCUMENTS 6,058,489 A * 5/2000 Schultz ................. G06F 3/0626
714/6.32
6,285,607 B1 * 9/2001 Sinclair .................. G11C 29/88
365/189.15
(Continued)

FOREIGN PATENT DOCUMENTS

TW 200900943 1/2009
TW 200921385 5/2009

OTHER PUBLICATIONS

"Office Action of Taiwan Counterpart Application", dated Feb. 17, 2016, p. 1-p. 8.

*Primary Examiner* — Reba I Elmore
(74) *Attorney, Agent, or Firm* — JCIPRNET

(57) ABSTRACT

A region descriptor management method and an electronic apparatus are provided. The region descriptor management method is adapted to a device controller of the electronic apparatus and includes following steps. Region descriptor entries are fetched from a region descriptor table. Each of the region descriptor entries includes a block initial address and a block length to describe a memory block of a memory module. According to the block initial addresses and the block lengths of the region descriptor entries, a portion of the region descriptor entries are adjusted to be at least one current region descriptor entry. Based on the at least one current region descriptor entry, a current region descriptor table is generated.

12 Claims, 4 Drawing Sheets

(51) Int. Cl.
*G06F 12/02* (2006.01)
*G06F 3/06* (2006.01)
*G06F 12/1009* (2016.01)
*G06F 12/0802* (2016.01)
*G06F 13/42* (2006.01)
*G06F 12/06* (2006.01)

(52) U.S. Cl.
CPC .......... *G06F 3/0631* (2013.01); *G06F 3/0658* (2013.01); *G06F 3/0668* (2013.01); *G06F 3/0688* (2013.01); *G06F 12/0223* (2013.01); *G06F 12/0292* (2013.01); *G06F 12/0623* (2013.01); *G06F 12/0646* (2013.01); *G06F 12/0802* (2013.01); *G06F 12/1009* (2013.01); *G06F 13/4208* (2013.01)

(58) Field of Classification Search
CPC .. G06F 3/0688; G06F 3/1694; G06F 12/0292; G06F 12/0223; G06F 12/0623; G06F 13/4208; G06F 13/4221; G06F 13/4234; G06F 13/385
USPC ........ 711/105, 154, 170, 202; 710/8, 23, 26, 710/34, 43, 60, 310, 315; 712/16, 36, 712/225
See application file for complete search history.

(56) References Cited

U.S. PATENT DOCUMENTS

| | | | |
|---|---|---|---|
| 8,055,816 B2 | 11/2011 | Asnaashari et al. | |
| 8,843,663 B2 | 9/2014 | Chiu et al. | |
| 2008/0270639 A1* | 10/2008 | Elhamias | G06F 3/0607 710/16 |
| 2009/0006670 A1* | 1/2009 | Guok | G06F 12/128 710/36 |
| 2010/0186077 A1* | 7/2010 | Chang | G06F 12/0246 726/9 |
| 2010/0217926 A1* | 8/2010 | Sinclair | G06F 3/0607 711/103 |
| 2013/0091307 A1 | 4/2013 | Lai et al. | |
| 2013/0159362 A1* | 6/2013 | Halpern, III | G06F 3/0622 707/823 |
| 2014/0337542 A1* | 11/2014 | Fujimoto | G06F 13/28 710/22 |

* cited by examiner

REGION DESCRIPTOR MANAGEMENT METHOD AND ELECTRONIC APPARATUS THEREOF

CROSS-REFERENCE TO RELATED APPLICATION

This application claims the priority benefit of Taiwan application serial no. 104107010, filed on Mar. 5, 2015. The entirety of the above-mentioned patent application is hereby incorporated by reference herein and made a part of this specification.

BACKGROUND OF THE DISCLOSURE

1. Field of the Disclosure

The disclosure generally relates to a management method and an electronic apparatus using the same, more particularly, to a region descriptor management method and an electronic apparatus using the same.

2. Description of Related Art

In the related arts, if a storage device or a peripheral device performs data transmission with a system memory of a host system, a direct memory access process may be used to perform data transmission without increasing the loading of the host system.

In general, the memory block of the system memory may be defined by the region descriptor. In other words, the region descriptor is used to define the location of each of the data segments in the system memory. In detail, each of the region descriptor entries respectively records an initial address and a length of the memory block. Thus, the storage device may further access a particular memory block by fetching the region descriptor entries, and thereby performing the data transmission.

In the related arts, the region descriptor entries are allocated by the host system corresponding to the data segments within the system memory. However, in consideration of efficacy or corresponding different specifications of the storage devices, the allocation of the region descriptor entries is generally complicated or weak, and thereby resulting that the performance of transmission speed and efficacy of the data transmission between the storage device and the system memory is comparatively poor.

SUMMARY OF THE DISCLOSURE

The disclosure provides a region descriptor management method and an electronic apparatus thereof, capable of improving the data transmission speed between the storage device and the system memory through adjusting, combining, and dividing a portion of region descriptor entries.

An embodiment of the disclosure provides a region descriptor management method suitable for a device controller of an electronic apparatus. The management method includes the following steps. A plurality of region descriptor entries are fetched from a region descriptor table, wherein each of the region descriptor entries includes a block initial address and a block length to correspondingly describe a memory block of a memory module. According to the block initial addresses and the block lengths of the plurality of region descriptor entries, a portion of the plurality of region descriptor entries is adjusted to be at least one current region descriptor entry. Based on the at least one current region descriptor entry, a current region descriptor table is generated.

An embodiment of the disclosure provides an electronic apparatus including a host system, a storage device and a device controller. The host system has a memory module, and the device controller is coupled between the host system and the storage device. The device controller fetches a plurality of region descriptor entries from a region descriptor table of the host system, wherein each of the region descriptor entries includes a block initial address and a block length to correspondingly describe a memory block of a memory module. According to the block initial addresses and the block lengths of the plurality of region descriptor entries, the device controller adjusts a portion of the plurality of region descriptor entries to be at least one current region descriptor entry. Based on the at least one current region descriptor entry, the device controller further generates a current region descriptor table.

In light of the above, in the region descriptor management method and the electronic apparatus thereof provided in the embodiments of the disclosure, during the data transmission, the plurality of region descriptor entries provided by the host system are adjusted first, so as to generate at least one current region descriptor entry. The current region descriptor entry describes the memory block in the memory module in an improved manner, so as to increase the data transmission speed and efficacy between the storage device and the memory module.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
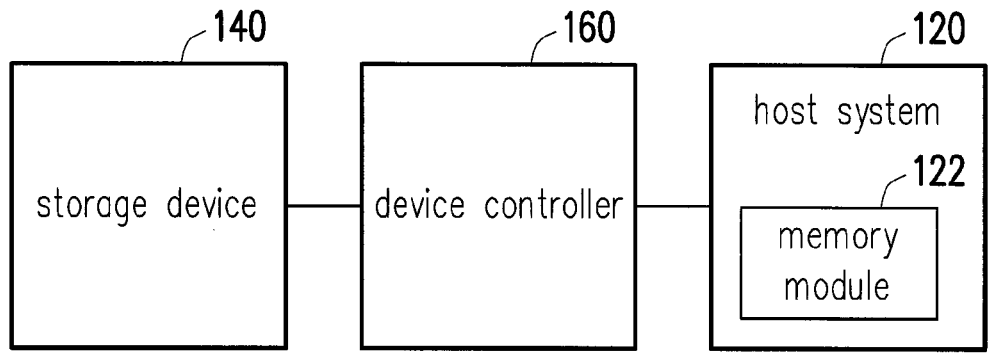
FIG. 1 is a block diagram of an electronic apparatus according to one exemplary embodiment of the disclosure.

Descriptions of the disclosure are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

The disclosure provides a region descriptor management method and an electronic apparatus thereof, wherein the region descriptor management method is adapted to a controller or a system on chip (SOC) coupled between a storage device and a host system. FIG. 1 is a block diagram of an electronic apparatus according to one exemplary embodiment of the disclosure. For example, the electronic apparatus is a desktop computer, a notebook computer, a tablet computer, a smart phone, and so on, but the disclosure is not limited thereto. Referring to FIG. 1, the electronic apparatus 100 includes a host system 120, a storage device 140 and a device controller 160. The device controller 160 is coupled between the host system 120 and the storage device 140.

The host system 120 includes a processing unit (not shown) and a memory module 122, for example. The processing unit is a central processing unit (CPU) or a microprocessor which is programmable for general application or specific application, and used for performing various programs or softwares so as to provide different functions, for example. The memory module 122 is the main memory of the host system 120, for example, which may be a static random access memory (SRAM), a dynamic random access memory (DRAM), or a synchronous dynamic random access memory (SDRAM).

The storage device 140 may be a hard disk drive (HDD), an optical disk drive (ODD), or a solid state drive (SSD), which has a parallel advanced technology attachment (PATA) interface, a serial advanced technology attachment (SATA) interface, a peripheral component interconnect express (PCIE), or a serial attached SCSI (SAS) interface. The device controller 160 may be, for example, an embedded controller or a control chip. In one exemplary embodiment of the disclosure, the device controller 160 includes a host bus adaptor (HBA) which complies with the standard of an advanced host controller interface (AHCI), so as to perform the data transmission between the host system 120 and the storage device 140, but the disclosure is not limited thereto. In more detail, the region descriptor management method proposed in the disclosure is also adapted for device controller 160 of different standards. However, in order to more clearly describe the region descriptor management method of the disclosure, the device controller 160 which complies with the AHCI standard, together with the electronic apparatus 100, is used to describe the region descriptor management method as illustrated in the following.

Figure 2:
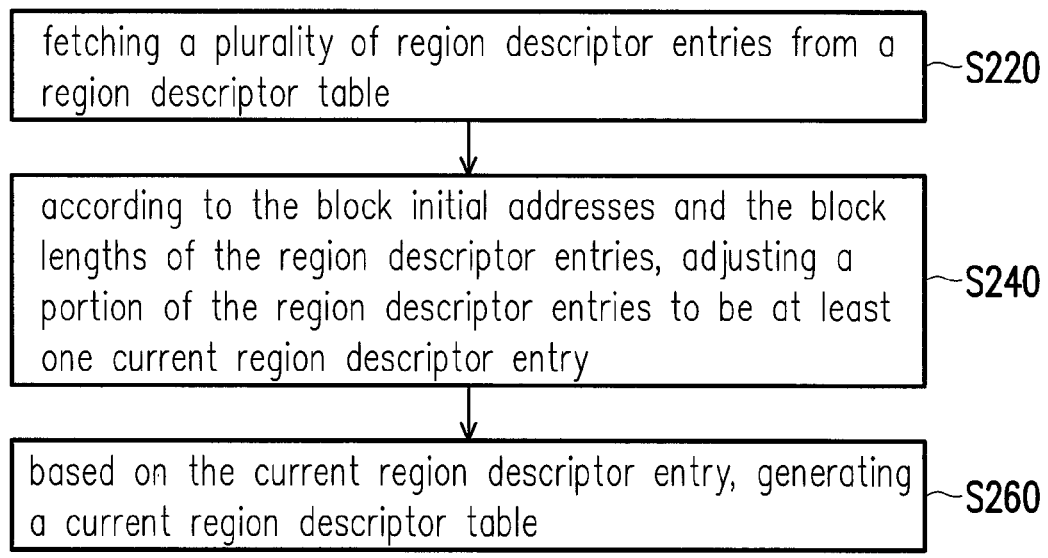
FIG. 2 is a flowchart illustrating a region descriptor management method according to one exemplary embodiment of the disclosure.

FIG. 2 is a flowchart illustrating a region descriptor management method according to one exemplary embodiment of the disclosure. Referring to FIG. 1 and FIG. 2 together, the region descriptor management method includes the following steps. The device controller 160 fetches a plurality of region descriptor entries from the region descriptor table (step S220), wherein each of the region descriptor entries includes a block initial address and a block length to correspondingly describe a memory block of the memory module 122. Next, according to the block initial addresses and the block lengths of the plurality of region descriptor entries, the device controller 160 adjusts a portion of the plurality of region descriptor entries to be at least one current region descriptor entry (step S240). Finally, based on the at least one current region descriptor entry, the device controller 160 generates a current region descriptor table (step 260).

In one exemplary embodiment of the disclosure, under the AHCI standard, the host system 120 issues a command to the device controller 160 from a command list of the memory module 122. The host system 120 puts the command into the slot of the command list, and notifies the device controller 160. The device controller 160, after receives the notification, fetches the command from the memory module 122 and performs the related process according to the command, for example, data transmission. It should be noted that, in the command, the memory block of the memory module 122 which participates in the data transmission is described by the region descriptor (i.e., the physical region descriptor (PRD) under the AHCI standard). For example, the region descriptor includes the block initial address and a block length of the memory block (i.e., the data base address (DBA) and the data byte count (DBC) under the AHCI standard), which correspondingly indicates the data's storage location or transmission location in the memory module 122. In more detail, the command includes a region descriptor table (i.e., the physical region descriptor table (PRDT) under the AHCI standard), and the region descriptor table further includes a plurality of region descriptor entries (i.e., the physical region descriptor entries under the AHCI standard). Each of the region descriptor entries correspondingly records location information of one memory block.

The device controller 160 uses a scatter/gather mechanism to perform the data transmission, for example. Specifically, the device controller 160 obtains a plurality of region descriptors related to the data transmission at first, and then performs the data transmission of the memory blocks of the memory module 120 correspondingly described by the region descriptors. In general, when the block length indicated by each of the region descriptors in the device controller 160 is the most appropriate block length (e.g., 4096 bytes or 8192 bytes), then the performance of the data transmission is comparatively favorable. However, the region descriptor entries allocated by the host system 120 is generally stray, and not every one of the region descriptor entries is allocated according to the most appropriate block length of the storage device 140, such that the device controller 160 may not achieve the best result in performing the data transmission, and thus may need more times and reduces the whole efficacy.

Figure 3:
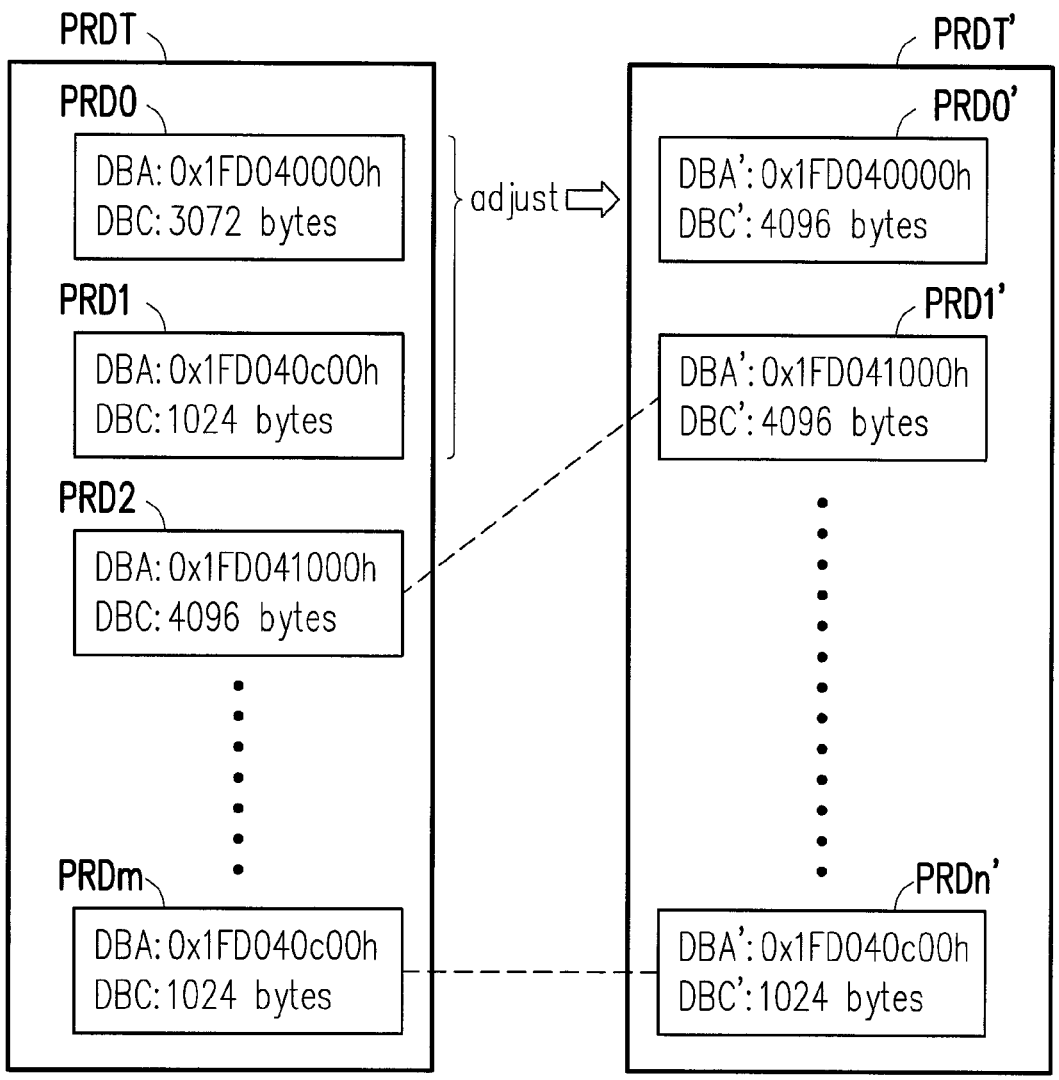
FIG. 3 is a schematic view illustrating that a portion of the region descriptor entries is adjusted to be a current region descriptor entry according to one exemplary embodiment of the disclosure.

In one embodiment of the disclosure, after the device controller 160 fetches a plurality of region descriptor entries from a region descriptor table, then according to the block initial addresses and the block lengths of the region descriptor entries, the device controller 160 selectively adjusts a portion of the region descriptor entries. FIG. 3 is a schematic view illustrating that a portion of the region descriptor entries is adjusted to be a current region descriptor entry according to one exemplary embodiment of the disclosure. As shown in FIG. 3, from the data base addresses (DBA) (the block initial addresses) (0x1FD040000h, 0x1FD040c00h, hexadecimal) and the data byte counts (DBC) (the block lengths) (3072 bytes, 1024 bytes) of the region descriptor entries PRD0, PRD1 of the region descriptor table PRDT, it can be known that, the memory blocks described by the region descriptor entries PRD0, PRD1 are continuously arranged in the memory module 122. Based on the abovementioned, in order that the device controller 160 may perform the data transmission preferably, first, the device controller 160 may adjust the region descriptor entries PRD0, PRD1 to be the current region descriptor entry PRD0'. As shown in FIG. 3, the memory block described by the current region descriptor entry PRD0' is the combination of the two memory blocks respectively described by the region descriptor entries PRD0, PRD1. In addition, the current block length DBC' indicated by the current region descriptor entry PRD0' is 4096 bytes and complies with the most appropriate block length of the data transmission, and the current block initial address DBA' is the block initial address DBA of the region descriptor entry PRD0.

Based on the abovementioned current region descriptor entry PRD0', the device controller 160 generates the current region descriptor table PRDT'. It should be noted that, the other region descriptor entries PRD2 to PRDm which do not need to be adjusted are correspondingly maintained and adjusted to be current region descriptor entries PRD1' to PRDn', and are put in the current region descriptor table PRDT' in the same way. In the embodiment, n and m are positive integers greater than 2, and n is equal to m−1.

The embodiment shown in FIG. 3 is merely one of the embodiments illustrating that the region descriptor entries are adjusted to be the current region descriptor entry, but the disclosure is not limited thereto. The following illustrates the details of adjusting the region descriptor entries to be the current region descriptor entry.

Figure 4A:
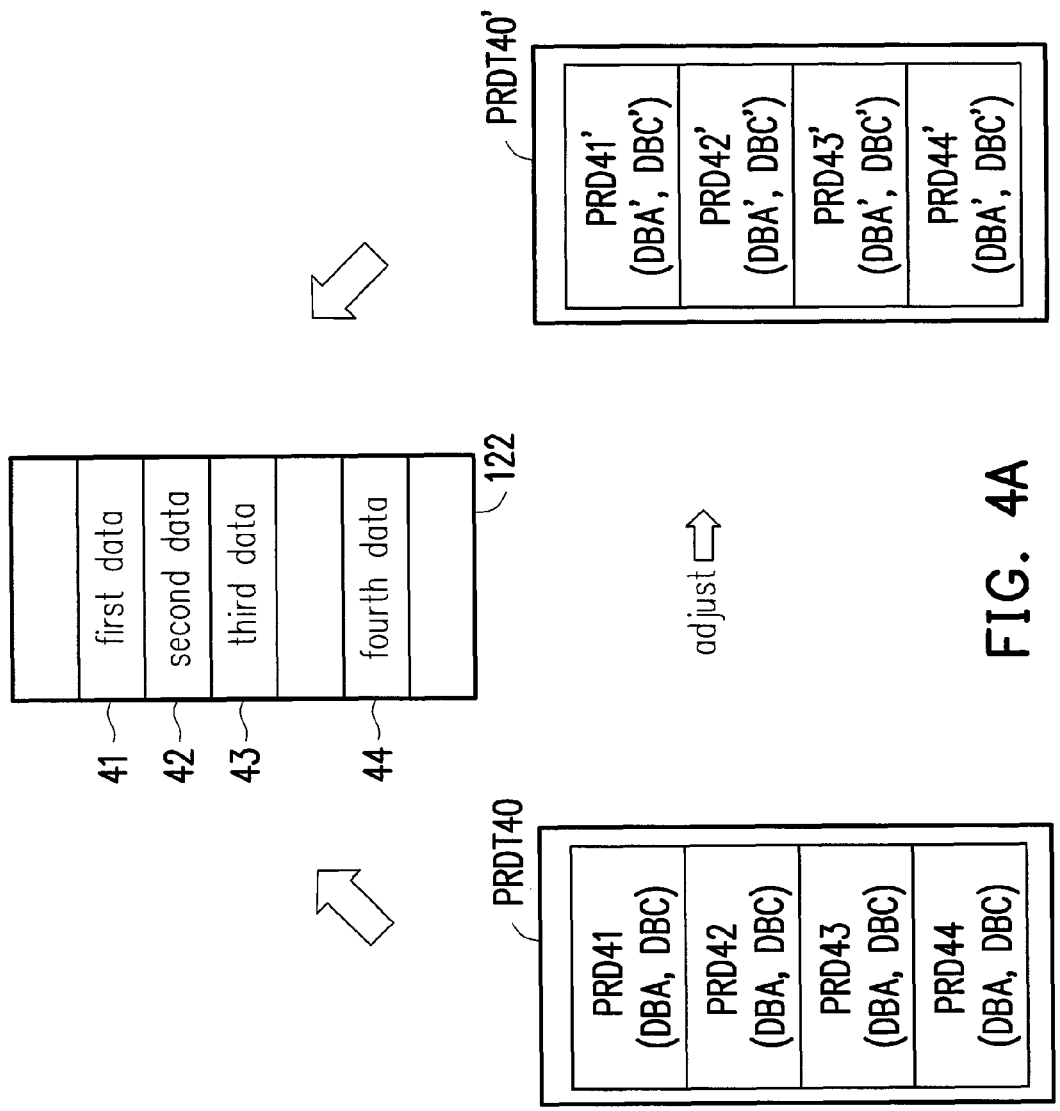
FIG. 4A is a schematic view illustrating a current region descriptor table according to one exemplary embodiment of the disclosure.
Figure 4B:
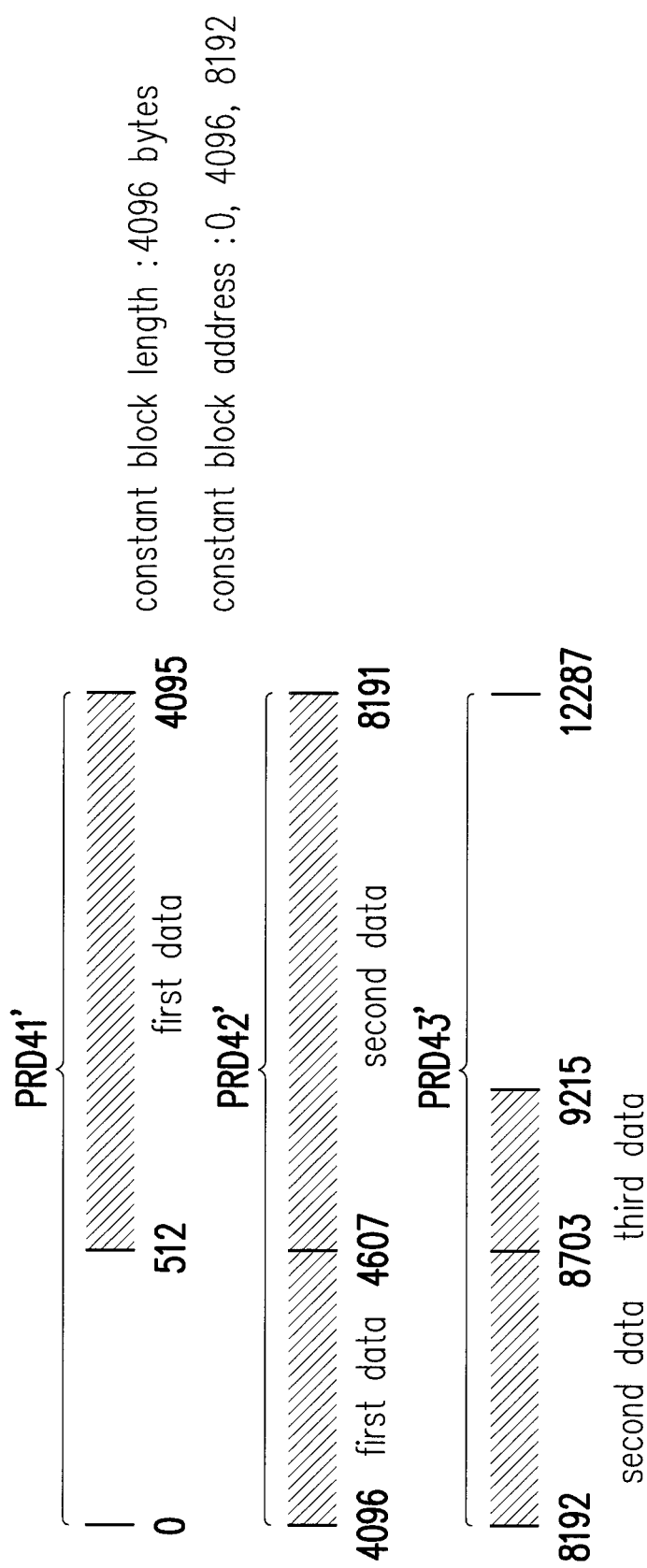
FIG. 4B is a schematic view illustrating current region descriptor entries according to one exemplary embodiment of the disclosure.

FIG. 4A is a schematic view illustrating a current region descriptor table according to one exemplary embodiment of the disclosure. FIG. 4B is a schematic view illustrating a current region descriptor entries according to one exemplary embodiment of the disclosure. Referring to FIG. 1 to FIG. 3, FIG. 4A and FIG. 4B, as mentioned above, the memory blocks described by the plurality of region descriptor entries which may be adjusted to be current region descriptor entries, for example, are continuously arranged in the memory module 122. Taking the memory module 122 of FIG. 4A and FIG. 4B as an example, the memory blocks 41 to 44 respectively correspondingly stores the first data to the fourth data, and the memory blocks 41 to 43 are continuously arranged in the memory module 122. At this moment, the region descriptor entries PRD41 to PRD43 which are previously used to respectively describe the memory blocks 41 to 43 may be adjusted to be current region descriptor entries PRD41' to PRD43', and the region descriptor entry PRD44 which is used to describe the memory block 44 is maintained and adjusted to be PRD44'.

In the adjusting process, the device controller 160 uses a plurality of constant block addresses and a constant block length to compare the block initial addresses DBA and the block lengths DBC of the region descriptor entries PRD41 to PRD43, and thereby generating the current block initial addresses DBA' and the current block lengths DBC'. In the embodiment, the constant block length is the abovementioned most appropriate block length (taking 4096 bytes as an example in this embodiment), and the constant block addresses may be the addresses of one or more constant block lengths distant from 0, for example, addresses of 0, 4096, 8192, and so on (using byte for the unit, decimal). The device controller 160 uses the constant block length and the constant block addresses to compare memory blocks 41 to 43 where the first data to the third data are located (the block initial addresses DBA and the block lengths DBC), and thereby obtaining the plurality of current block initial addresses 512, 4096, 8192 and a plurality of current block lengths 3584 bytes, 4096 bytes, 1024 bytes. Finally, according to the current block initial addresses DBA' and the current block lengths DBC', the current region descriptor entries PRD41' to PRD43' are obtained.

It can be noted that, in the process of adjusting the region descriptor entries PRD41 to PRD43 to be the current region descriptor entries PRD41' to PRD43', the memory blocks 41 to 43 (corresponding to the first data to the third data) described by the region descriptor entries PRD41 to PRD43 are combined and divided, and thereby generating the current block initial addresses DBA' and the current block lengths DBC' which comply with the constant block length and the constant block addresses. Obviously, all of the current block lengths DBC' indicated by the current region descriptor entries PRD41' to PRD43' are not greater than the constant block length, i.e., 4096 bytes.

In one exemplary embodiment of the disclosure, the device controller 160 further performs the data transmission process of the memory blocks indicated by the current region descriptor entries according to the current region descriptor table (e.g., the PRDT' shown in FIG. 3 or the PRDT'40 shown in FIG. 4A). The device controller 160 may obtain the data from the memory blocks indicated by the current region descriptor entries and store the data into the storage device 140, or the device controller 160 may obtain the data from the storage device 140 and store the data into the memory blocks indicated by the current region descriptor entries. Finally, with respect to the generated current region descriptor entries, the device controller 160 may also write them into the memory module 122 so as to update the region descriptor table PRDT which is stored in the memory module 122.

In light of the foregoing, in the region descriptor management method and the electronic apparatus thereof provided in the embodiments of the disclosure, the plurality of region descriptor entries provided by the host system are adjusted, so as to generate at least one current region descriptor entry. The current region descriptor entries describe the memory blocks in the memory module in a comparatively favorable manner. Based on the current region descriptor entries, the device controller may perform data transmission in a better speed and efficacy, and thereby obtaining the data from the memory blocks indicated by the current region descriptor entries and storing the data into the storage device, or thereby the device controller may obtain the data from the storage device and store the data into the memory blocks indicated by the current region descriptor entries.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A region descriptor management method, adapted to a device controller of an electronic apparatus, the management method comprising:
   fetching a plurality of region descriptor entries from a region descriptor table, wherein each of the plurality of region descriptor entries comprises a block initial address and a block length to correspondingly describe a memory block of a memory module;
   according to the block initial addresses and the block lengths of the plurality of region descriptor entries, combining and adjusting a portion of the plurality of region descriptor entries to be at least one current region descriptor entry; and
   based on the at least one current region descriptor entry, generating a current region descriptor table, wherein the number of current region descriptor entries in the current region descriptor table is less than the number of region descriptor entries in the region descriptor table.

2. The region descriptor management method as claimed in claim 1, wherein the memory blocks described by the portion of the plurality of region descriptor entries are physically continuously arranged in the memory module.

3. The region descriptor management method as claimed in claim 1, wherein the step of adjusting the portion of the plurality of region descriptor entries to be the at least one current region descriptor entry further comprises:
   by using a plurality of constant block addresses and a constant block length, comparing the block initial addresses and the block lengths of the portion of the plurality of region descriptor entries, so as to generate at least one current block initial address and at least one current block length; and according to the at least one current block initial address and the at least one current block length, obtaining the at least one current region descriptor entry.

4. The region descriptor management method as claimed in claim 3, wherein the current block length included in each of the at least one current region descriptor entry is not greater than the constant block length.

5. The region descriptor management method as claimed in claim 1, further comprising:

writing the at least one current region descriptor entry into the memory module.

6. The region descriptor management method as claimed in claim 1, further comprising:

performing a data transmission process of the at least one memory block indicated by the at least one current region descriptor entry.

7. An electronic apparatus, comprising:

a host system comprising a memory module;

a storage device; and a device controller, coupled between the host system and the storage device, wherein the device controller fetches a plurality of region descriptor entries from a region descriptor table of the host system, wherein each of the plurality of region descriptor entries comprises a block initial address and a block length to correspondingly describe a memory block of the memory module, wherein according to the block initial addresses and the block lengths of the plurality of region descriptor entries, the device controller combines and adjusts a portion of the plurality of region descriptor entries to be at least one current region descriptor entry, and based on the at least one current region descriptor entry, the device controller generating a current region descriptor table, wherein the number of current region descriptor entries in the current region descriptor table is less than the number of region descriptor entries in the region descriptor table.

8. The electronic apparatus as claimed in claim 7, wherein the memory blocks described by the portion of the plurality of region descriptor entries are physically continuously arranged in the memory module.

9. The electronic apparatus as claimed in claim 7, wherein by using a plurality of constant block addresses and a constant block length, the device controller compares the block initial addresses and the block lengths of the portion of the plurality of region descriptor entries, so as to generate at least one current block initial address and at least one current block length, and according to the at least one current block initial address and the at least one current block length, the device controller obtains the at least one current region descriptor entry.

10. The electronic apparatus as claimed in claim 9, wherein the current block length included in each of the at least one current region descriptor entry is not greater than the constant block length.

11. The electronic apparatus as claimed in claim 7, wherein the device controller writes the at least one current region descriptor entry into the memory module.

12. The electronic apparatus as claimed in claim 7, wherein the device controller obtains a data from the at least one memory block described by the at least one current region descriptor entry and stores the data in the storage device, or the device controller obtains a data from the storage device and stores the data in the at least one memory block described by the at least one current region descriptor entry.

* * * * *